United States Patent [19]

Snyder, Jr.

[11] Patent Number: 5,723,059

[45] Date of Patent: Mar. 3, 1998

[54] FLUID DENSITY ADJUSTMENT FOR FUNCTIONAL FLUIDS

[75] Inventor: Carl E. Snyder, Jr., Trotwood, Ohio

[73] Assignee: The United States of America as represented by the Secretary of the Air Force, Washington, D.C.

[21] Appl. No.: 668,610

[22] Filed: May 21, 1996

[51] Int. Cl.$^6$ .................................................. C09K 5/00
[52] U.S. Cl. ........................ 252/70; 165/10; 252/73; 252/74
[58] Field of Search ........................ 252/70, 73, 74; 165/10

[56] References Cited

U.S. PATENT DOCUMENTS

| | | |
|---|---|---|
| 3,596,713 | 8/1971 | Katz ................................ 165/107 |
| 4,033,892 | 7/1977 | Stangroom ......................... 252/76 |
| 4,314,984 | 2/1982 | Lawson et al. ..................... 423/579 |
| 4,812,251 | 3/1989 | Stangroom ......................... 252/75 |
| 4,911,232 | 3/1990 | Colvin et al. ................... 165/104.17 |
| 5,007,478 | 4/1991 | Sengupta .......................... 165/10 |
| 5,209,861 | 5/1993 | Gschwender et al. .............. 252/78.1 |
| 5,448,108 | 9/1995 | Quon et al. ....................... 257/714 |

*Primary Examiner*—Christine Skane
*Attorney, Agent, or Firm*—Charles E. Bricker; Thomas L. Kundert

[57] ABSTRACT

The dispersion of a solid material in a fluid is improved by modifying the density of the fluid to match the density of the solid material. The method of the present invention comprises the addition of about 1 to 25 weight percent of a saturated oligomer of at least one halocarbon to a slurry of microencapsulated phase change materials in a poly-alpha-olefin fluid to improve the dispersion of the microencapsulated materials in the fluid.

2 Claims, No Drawings

FLUID DENSITY ADJUSTMENT FOR FUNCTIONAL FLUIDS

The invention described herein may be manufactured and used by or for the Government of the United States for all governmental purposes without the payment of any royalty.

BACKGROUND OF THE INVENTION

This invention relates to heat transfer fluids, particularly fluids for cooling electronic components.

Heat transfer fluids are fluids which absorb thermal energy delivered from a source and then surrender that heat to a place of utilization called a "sink." The reversed process is also possible whereby the sink is at a higher temperature than the fluid; and thereby, becomes a source in which case the fluid acts as a coolant. In order to qualify as a heat transfer fluid, many criteria must be met which then determine the ultimate potential use of the fluid. A lengthy list of properties must be determined for each fluid in order to assess its value as a heat transfer fluid.

Some of the properties which need be measured on heat transfer fluids are called "design properties." These are properties which define the heat transfer and transport capabilities of the fluids in question. Properties such as the following must be known: (1) density, specific gravity and expansion coefficient, (2) heat capacity, (3) heat content, (4) heat conductivity and (5) viscosity.

A second group of properties which must be defined are construction properties which are the limiting properties which ultimately fix the range of application for the heat transfer fluid. These are called the "limiting properties," and they consist of: (1) physical stability, (2) chemical stability, (3) thermal stability and (4) cost.

A third group of properties which must be measured on any potential heat transfer fluid are operation properties. These properties involve the compatibility of the fluid and its environment; and include parameters such as the following: (1) surface tension, (2) corrosivity, (3) flammability, (4) toxicity, (5) electrical properties, (6) appearance, (7) order, (8) biodegradability and (9) compatibility with materials of construction and the environment.

Poly-alpha-olefins are particularly suited for use as heat transfer fluids because of their compact, highly branched structure. This structure leads the following properties which are advantageous: (1) they have a low viscosity for a given molecular weight as compared to mineral oil; (2) they have very high flash and fire points for a given viscosity; (3) they have very high viscosity index which ensures good low temperature fluidity; (4) they have excellent oxidative stability where there is the occasional unavoidable exposure to air during operation; (5) their compact, high molecular weight, pure hydrocarbon structure, renders them odor-free, non-toxic and biodegradable.

Poly-alpha-olefins, having flash points of at least 325° F. coupled with pour points not higher than −35° F. and Kinematic viscosities not higher than 25 cSt at 210° F. so that they can maintain good pumpability below room temperature, can be prepared as described in U.S. Pat. No. 4,041,098. They, thus, offer a combination of properties unattainable by the use of other pure hydrocarbon fluids. The hydrocarbon oils which can be used are those produced from alpha-olefins of C6 to C12 such as hexene, heptene, octene, nonene, decene, undecene, dodecene.

The synthetic hydrocarbon oils useable herein are those having average molecular weights essentially between about 600 and 1,000, preferably between 650 and 900. A preferred feature of the synthetic hydrocarbon oil is that it be of low unsaturation. It has been determined that there is a substantially direct relationship between the moles of unsaturation (C=C) and the effectiveness of the antioxidant system. Thus, the synthetic oil should have less than about 0.25 mole of (C=C) per 1,000 gm. of oil, preferably less than 0.15, and most preferably less than 0.05.

Especially preferred as heat transfer fluids for use pursuant to the present invention, are hydrocarbon oils prepared from alpha olefins of C8, C9 and/or C10 and mixtures thereof, which have a pour point of no higher than about −35° F., a kinematic viscosity no higher than about 25 centistokes at 210° F. and a flash point of at least about 325° F.

Various antioxidant components may be added to the oils mentioned to prolong the life of said oils during use. Phenolic type antioxidants are well known in the art and can be used.

The poly-alpha-olefins offer a unique combination of low flammability, good pumpability, non-toxicity, non-corrosivity, biodegradability, component and environmental compatibility, high interfacial tension (lead resistance) and intermediate cost.

Heat transfer in electronic systems has become a critical design parameter as module level heat transfer has increased exponentially making current cooling technologies inadequate. Thermal management of electronic devices has become an extremely important field as miniaturization technology has advanced, creating very high heat fluxes at the module level. Further, the performance and reliability of electronic devices are dependent on the maintenance of suitable operating temperatures and a minimization of temperature variations. Therefore, heat generated in a module during normal operation must be continuously removed in order to maintain individual electronic components at approximately constant temperatures for optimum operation. Peak loads which can cause a sudden temperature rise also occur from time to time and it is critical that the cooling system be capable of handling such transient loads.

Previous research has shown that solid-liquid suspensions of carrier fluid and particles that undergo a reversible latent heat of fusion transition upon heating and cooling have superior heat transfer characteristics as compared to simple fluids. This is due to a combination of factors. The first factor is a difference in the thermophysical properties of a mixture as compared to that of a suspended liquid. The overall heat transfer is determined by the actual properties of the suspension itself. For forced convection flows, the relevant properties are thermal conductivity, specific heat and viscosity. For natural convection, the coefficient of thermal expansion must also be considered. In addition to the actual property changes, the microconvective effects due to the presence of particles themselves enhances heat transfer.

The particles that undergo a reversible latent heat of fusion transition upon heating and cooling store their thermal energy in the form of a physical change of state, i.e., melting or freezing. In order to avoid any possible reaction with the system or with the carrier fluid, the particles are microencapsulated in a suitable shell material, generally a polymeric shell. The technology of microencapsulated phase change materials is well known to those skilled in the art and further discussion is not believed necessary.

In addition to the increase in effective specific heat because of the latent heat of melting, the use of a phase change material also helps sustain a large temperature difference with the suspension temperature remaining approximately constant until the phase change material has completely melted. This further enhances heat transfer.

Materials suitable for heat transfer applications include paraffins, organic acids, hydrated inorganic salts, low melting point metals and metallic eutectics, as well as a number of other organic materials which will be readily apparent to those skilled in the art. Exemplary latent energy transition materials include:

| Common Name | Approximate Transition Temperature (°C.) |
| --- | --- |
| Water | 0 |
| Tetradecane | 5-6 |
| Hexadecane | 17-18 |
| Octadecane | 24-27 |
| Methyl Palmitate | 30-32 |
| Eicosane | 35-39 |
| Sodium | 98 |
| Lithium | 181 |
| Pentaerythritol | 184-186 |
| Neopentylglycol | 184-186 |
| Tin | 232 |
| Bismuth | 271 |
| Zinc | 420 |
| Barium | 725 |

The encapsulating material can be any suitable material known in the art for micro-encapsulation. This material should have a melting point higher than the melting point of the phase change material and higher than the expected temperature caused by the electronic component overheating. The material should be resilient so as to withstand expansion and contraction of the phase change material as it changes phase, and must be compatible with the liquid and the phase change material it encloses.

A variety of techniques for manufacturing different types of microcapsules are known in the art. For example, there are chemical methods for forming such microcapsules, including coacervation and interfacial polymerization. In microencapsulation using coacervation, the core particles are uniformly dispersed in an appropriate medium the coacervate layer is deposited uniformly around the particles. The coating is then hardened by adding a reagent such as formaldehyde resulting in the cross-linking of the coacervate. In interfacial polymerization, the capsule wall is formed directly around the core material by polymerization reactions.

It has been found that the addition of microencapsulated phase change materials (MEPCM) to poly-alpha-olefin electronic coolant improves the thermal efficiency of the coolant. However, the MEPCM tend to settle out of the coolant with time. This in undesirable because the non-disbursed microcapsules can clog filters, orifices, pumps and the like. Additionally, the thermal efficiency gained by their addition is diminished.

Accordingly, it is an object of the present invention to provide a method to improve the dispersion of a solid material in a fluid.

Another object of the present invention is to provide a method to improve the dispersion of microencapsulated phase change materials in a poly-alpha-olefin fluid.

Other objects and advantages of the present invention will be apparent to those skilled in the art.

SUMMARY OF THE INVENTION

In accordance with the present invention there is provided a method to improve the dispersion of a solid material in a fluid, which comprises modifying the density of the fluid to match the density of the solid material. More specifically, the method of the present invention comprises the addition of about 1 to 25 weight percent of a saturated oligomer of at least one halocarbon to a slurry of microencapsulated phase change materials in a poly-alpha-olefin fluid to improve the dispersion of the microencapsulated materials in the fluid.

DETAILED DESCRIPTION OF THE INVENTION

The poly-alpha-olefin fluid can be any such fluid known in the art for cooling devices such as electronic components. These fluids are widely available. Similarly, microencapsulated phase change materials (MEPCM) are available.

Among the saturated halocarbon oligomers which are acceptable for use in the present invention are the chlorotrifluoroethylene-derived oligomers (CTFE). These materials are essentially non flammable due to their high degree of halogenation. CTFE fluids are saturated, low molecular weight oligomers of chlorotrifluoroethylene, typically having about 2 to 10 repeating units in the oligomer chain. The terminal groups of the oligomer chain are generally derived from the catalyst and/or the solvent used in the oligomerization process. The chemical and thermal stability of such CTFE fluids is enhanced by chlorination or fluorination of the terminal groups of the oligomer.

In practice, the saturated halocarbon oligomer is added to the composite coolant, i.e., the mixture of poly-alpha-olefin fluid and microencapsulated phase change material, until the microencapsulated material becomes neutrally buoyant. The amount of oligomer can be determined empirically or by using the approximating formula:

$$V_{oligomer} = V_{original} \times ((D_{desired} - D_{alpha-olefin})/(D_{oligomer} - D_{desired}))$$

where $V_{oligomer}$ is the volume of oligomer to add, $D_{oligomer}$ is the density of the oligomer, $V_{original}$ is the original volume of the poly-alpha-olefin fluid, $D_{original}$ is the density of the poly-alpha-olefin fluid and $D_{desired}$ is the desired density or the density of the microencapsulated material. In order to maintain efficient operation of the system, it is important that the viscosity of the oligomer be low enough so as to avoid adversely affecting the low temperature operational capability of the composite coolant. The volatility of the oligomer is also important inasmuch as the density-increasing ingredient should not volatilize during handling or use, thereby changing the composition of the fluid.

The method of this invention can be employed in other fluid systems wherein solid materials are suspended in liquid media. Examples include greases, ferrofluids and electrorheological fluids.

Various modifications may be made in the instant invention without departing from the spirit and scope of the appended claims.

I claim:

1. A method to improve the dispersion of microencapsulated phase change materials in a poly-alpha-olefin electronic coolant fluid, which comprises modifying the density of the fluid to match the density of the phase change material by the addition of about 1 to 25 weight percent of a saturated oligomer of chlorotrifluoroethylene.

2. The method of claim 1 wherein said oligomer has about 2 to 10 repeating units in the oligomer chain.

* * * * *